United States Patent
Brochot et al.

(10) Patent No.: US 10,427,340 B2
(45) Date of Patent: Oct. 1, 2019

(54) METHOD FOR MANUFACTURING A TOOTHED WHEEL WITH REINFORCING STRAPPING

(71) Applicant: JTEKT EUROPE, Irigny (FR)

(72) Inventors: Patrice Brochot, Oullins (FR); Laurent Rey, Villeurbanne (FR)

(73) Assignee: JTEKT EUROPE, Irigny (FR)

( * ) Notice: Subject to any disclaimer, the term of this patent is extended or adjusted under 35 U.S.C. 154(b) by 428 days.

(21) Appl. No.: 15/314,644

(22) PCT Filed: May 19, 2015

(86) PCT No.: PCT/FR2015/051302
§ 371 (c)(1),
(2) Date: Nov. 29, 2016

(87) PCT Pub. No.: WO2015/185817
PCT Pub. Date: Dec. 10, 2015

(65) Prior Publication Data
US 2017/0225374 A1 Aug. 10, 2017

(30) Foreign Application Priority Data
Jun. 3, 2014 (FR) .................................. 14 55005

(51) Int. Cl.
*B29C 45/00* (2006.01)
*B29C 45/16* (2006.01)
(Continued)

(52) U.S. Cl.
CPC ...... *B29C 45/1671* (2013.01); *B29C 45/1459* (2013.01); *B29C 45/1657* (2013.01);
(Continued)

(58) Field of Classification Search
None
See application file for complete search history.

(56) References Cited

U.S. PATENT DOCUMENTS 3,733,921 A   5/1973 Carveth
5,722,295 A * 3/1998 Sakai .................. F16H 55/06
                                                    264/101

(Continued)

FOREIGN PATENT DOCUMENTS

DE   102005010444 A1   9/2006
DE   102006026568 A1   12/2007
(Continued)

OTHER PUBLICATIONS

Jul. 13, 2015 International Search Report issued in International Patent Application No. PCT/FR2015/051302.

*Primary Examiner* — Timothy Kennedy
(74) *Attorney, Agent, or Firm* — Oliff PLC

(57) ABSTRACT

A method of manufacturing a wheel has a step (a) during which, by injecting a first polymer material into a first mold, a bearing core is created that extends from a radially internal wall that forms the ball of a steering axis, as far as a radially external peripheral edge, followed by a step (b) of coating during which step a coating layer is overmolded in a second polymer material over the bearing core to form a rim around the peripheral edge, the method being such that during step (a) of creating the bearing core, a preformed reinforcing hoop made of a third material referred to as "reinforcing material" is placed in the first mold then the reinforcing hoop is at least partially embedded in the peripheral edge during injection of the first material.

8 Claims, 2 Drawing Sheets

(51) Int. Cl.
  *B29C 45/14* (2006.01)
  *B29L 31/32* (2006.01)
  *B29L 15/00* (2006.01)
  *F16H 55/06* (2006.01)
  *B29K 77/00* (2006.01)
  *B29K 705/12* (2006.01)

(52) U.S. Cl.
  CPC ...... *B29C 45/1676* (2013.01); *B29K 2077/00* (2013.01); *B29K 2705/12* (2013.01); *B29L 2015/006* (2013.01); *B29L 2031/32* (2013.01); *F16H 55/06* (2013.01); *F16H 2055/065* (2013.01)

(56) References Cited

U.S. PATENT DOCUMENTS

| | | | |
|---|---|---|---|
| 2010/0052412 A1* | 3/2010 | Morris | B29C 45/1657 301/64.701 |
| 2010/0201030 A1 | 8/2010 | Oberle | |
| 2010/0294064 A1 | 11/2010 | Seko | |
| 2013/0228028 A1 | 9/2013 | Kim et al. | |

FOREIGN PATENT DOCUMENTS

| | | |
|---|---|---|
| DE | 102008045847 A1 | 3/2010 |
| DE | 102012102778 A1 | 10/2013 |
| EP | 0267436 A1 | 5/1988 |
| EP | 2522480 A1 | 11/2012 |
| FR | 2385006 A1 | 10/1978 |
| JP | H09-280345 A | 10/1997 |
| JP | 2004-052791 A | 2/2004 |
| WO | 87/01168 A1 | 2/1987 |

* cited by examiner

METHOD FOR MANUFACTURING A TOOTHED WHEEL WITH REINFORCING STRAPPING

The present invention concerns the general field of manufacturing the wheels intended to ensure the transmission of a torque within a mechanism, and more particularly the field of manufacturing the toothed wheels intended for the gear-type mechanisms.

The present invention concerns more particularly the manufacturing of the toothed wheels intended for the power steering reducers for motor vehicles.

It is already known, in particular from the document US-2010/0201030, a method for manufacturing toothed wheels during which a metal hub as well as a toothed rim made of plastic material are placed in a mold, then the hub is connected to the rim by forming together, by molding operation, an intermediate disc made of plastic material.

Such a method can however have some disadvantages.

Indeed, such a method firstly requires positioning very accurately the rim relative to the hub when molding the intermediate disc. In practice, any positioning defect of the parts, or any uncontrolled displacement of one part relative to the other during molding operation, due to the pressure of the injected plastic, can lead to a significant concentricity defect of the wheel teeth relative to the axis of rotation of said wheel, which can compromise the proper operation of the toothed wheel (noise, wear . . . ), or even cause its immediate disposal.

Then, due to the fact that the intermediate disc and the rim of the toothed wheel are made of plastic materials, it is difficult to give said wheel a satisfactory rigidity.

Thus, the toothed wheel obtained by such a known method can tend, when subjected to high forces, and in particular to significant contact pressures with a worm screw, to deform by crushing, by undergoing an oval-making formation or even a local depression forming a kind of flat portions.

Of course, such deformations, which alter the circularity of the pitch diameter of the wheel, can disrupt the proper operation of said wheel, or even significantly reduce its lifetime.

Certainly, an attempt to overcome this lack of rigidity can be made by increasing the material thicknesses within the wheel, for example by providing for a particularly dense array of thick reinforcing ribs.

However, this increase in the used volume of material tends to increase the weight, and especially the overall dimension of the wheel, which can be incompatible with the implementation of said wheel within a mechanism subjected to severe imperatives of compactness.

Further, such a solution tends to generate some waste of raw material, and can also complicate the production of the mold and/or the molding operation itself.

The objects assigned to the invention therefore aim to overcome the aforementioned disadvantages and to propose a new method for manufacturing wheels, in particular toothed wheels, which allow obtaining, in a simple and inexpensive manner, wheels which are lightweight, rigid and resistant at the same time.

The objects assigned to the invention are achieved by means of a wheel manufacturing method, said method comprising a step (a) of producing a carrier core during which is produced, by injection of a first polymer material in a first mold, a carrier core which extends from a radially inner wall forming a bore having a main axis (XX'), corresponding to the axis of rotation of the wheel, up to a radially outer peripheral edge, said method then comprising a coating step (b) during which is produced, by overmolding operation on the carrier core, in a second polymer material, a coating layer in order to form a rim about the peripheral edge in the radial over-thickness of the radially outer surface of said peripheral edge, said method being characterized in that, during step (a) of producing the carrier core, is placed in the first mold, in the position substantially centered on the main axis (XX'), and before the injection of the first material, a preformed reinforcing ring, made of a third material called "reinforcing material" which is distinct from the first polymer material and from the second polymer material and which has a Young's modulus greater than that of the first material and than that of the second material, then is embedded, at least partially, said reinforcing ring, while injecting the first material, in the mass of said first material which forms the peripheral edge.

Advantageously, the integration to the carrier core, according to the invention, of a reinforcing ring, which is inherently more rigid than the (first and second) constitutive materials respectively of the carrier core and the of rim, allows to rigidify and to reinforce the peripheral edge of said carrier core, and more globally the wheel, against the centripetal radial crushing.

Indeed, said reinforcing ring shores up, in the manner of a hoop which forms a frame strapping, the peripheral edge of the carrier core and, by extension, the rim of the wheel.

Advantageously, the underlying implantation of the reinforcing ring, in the radial thickness of the wheel, and more particularly in the radial thickness of the carrier core, that is to say radially "under" the rim, makes the reinforcement of wheel by the reinforcing ring particularly compact and discreet.

The invention therefore allows improving the radial rigidity of the wheel by means of a relatively thin reinforcing ring, and thus authorizes the production of a particularly light and compact, although mechanically very resistant, wheel.

Further, the implantation of the reinforcing ring within the structure of the core is particularly simple and fast, since it suffices to bring the ring in the cavity of the (first) mold.

Finally, the reinforcement of the wheel being achieved by means of a reinforcing ring with a shape that is very simple to obtain, the manufacturing of the reinforced wheel according to the invention remains simple and inexpensive.

Other objects, characteristics and advantages of the invention will appear in more detail on the reading of the following description, as well as with the help of the annexed drawings, provided for illustrative and non-restrictive purposes, among which:

The present invention concerns a method for manufacturing a wheel 1, and more particularly a toothed wheel 1.

Said toothed wheel 1 can in particular be a gear reducer wheel, and more particularly, a reducer wheel for power steering.

As such, the wheel 1 can for example form a worm wheel intended to be driven by a worm screw.

The toothed wheel 1 can present any type of meshing teeth (not represented), for example forming a spur teeth, a helical teeth, or a herringbone teeth.

The wheel 1 will be advantageously fixed to a preferably metal socket 2, which will allow its mounting, for example by shrink-fitting, on a shaft (not represented).

Figure 1:
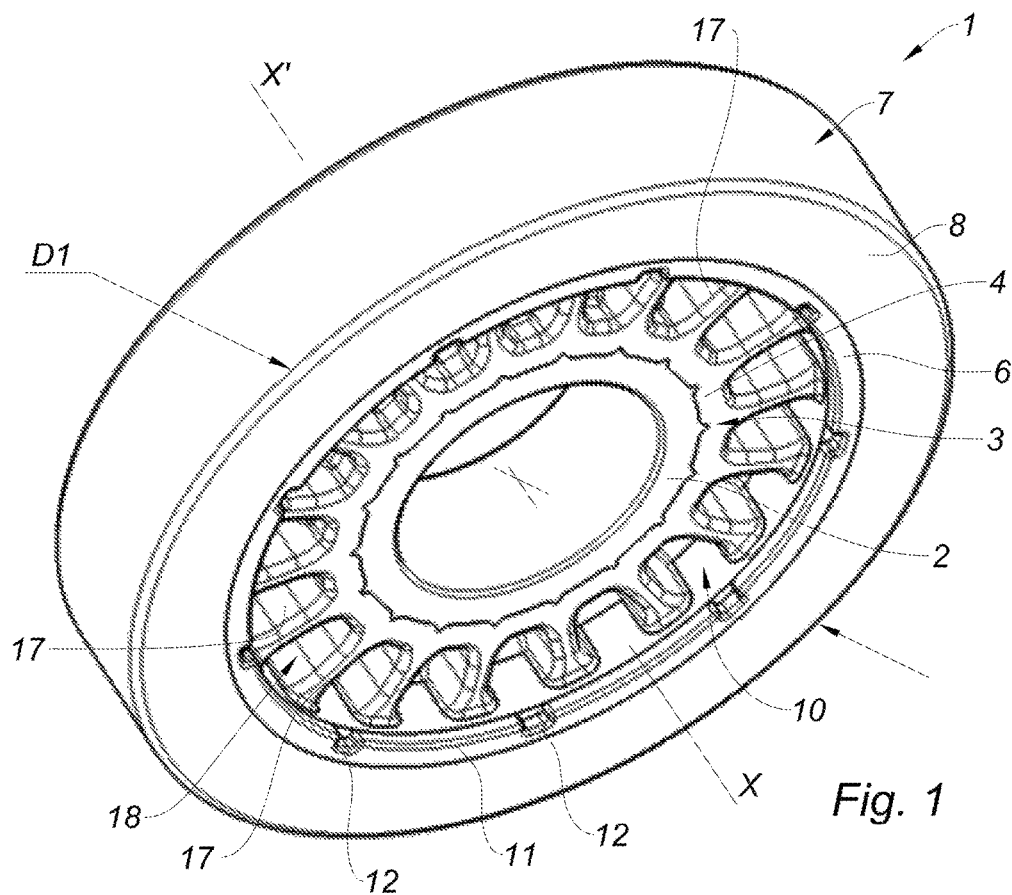
FIGS. 1 and 2 illustrate, respectively according to perspective and cutaway perspective overviews, an example of a wheel obtained by a manufacturing method according to the invention.
Figure 2:
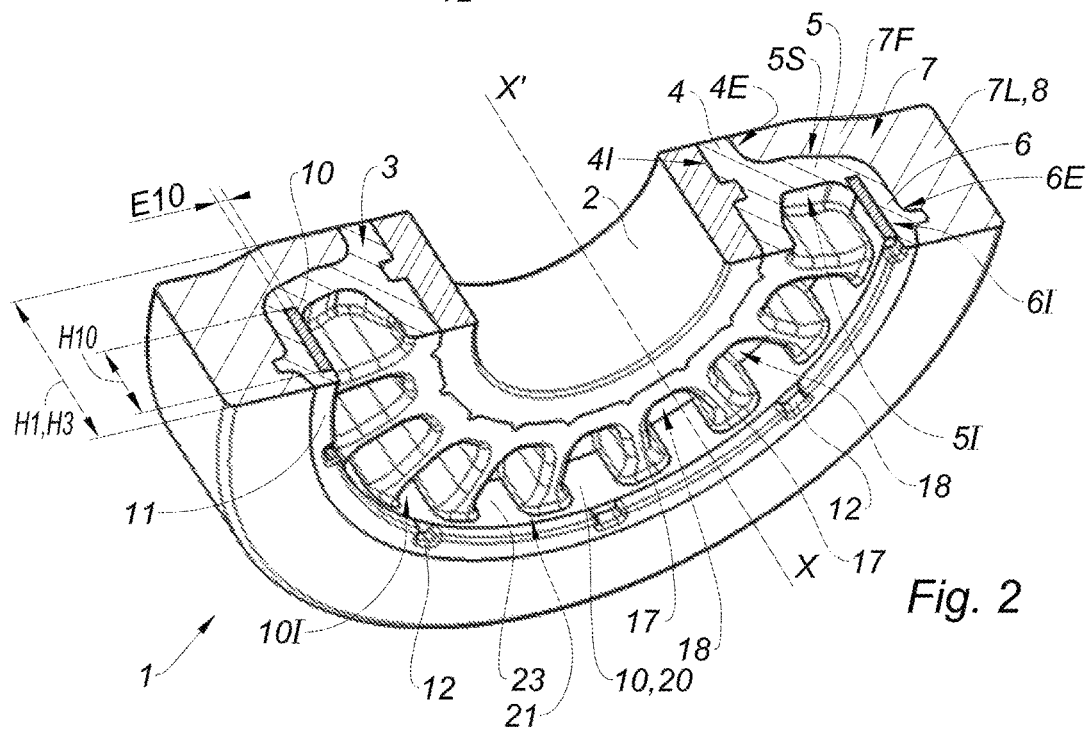
Figure 3:
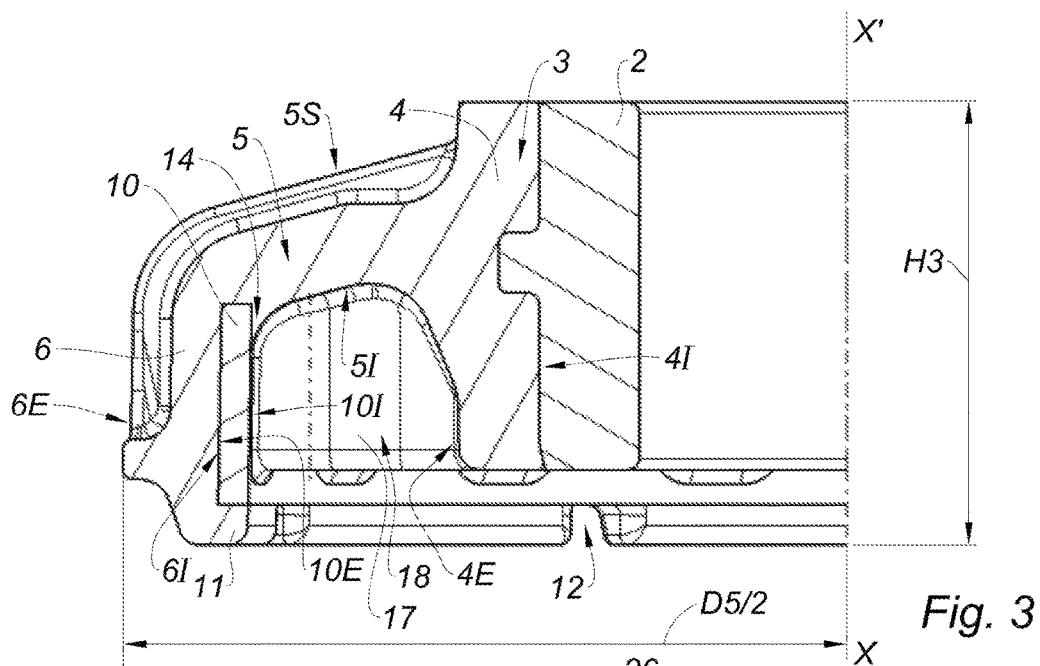
FIG. 3 illustrates, according to a partial longitudinal-sectional view, the detail of the carrier core used in the wheel of FIGS. 1 and 2.

Alternatively, the wheel 1 can be directly formed on a preferably metal shaft which materializes the axis of rotation of said wheel (in practice, it would be sufficient to substitute said shaft for the socket 2 in FIGS. 1 to 3).

Whatever the retained type of mounting, said shaft can comprise, preferably at one of its ends, a pinion allowing said shaft to be engaged with another toothed part, such as a steering column or a rack.

According to the invention, the method comprises a step (a) of producing a carrier core 3 during which is produced, by injection of a first polymer material in a first mold 30, a carrier core 3 which extends from a radially inner wall 4I forming a bore having a main axis (XX'), said main axis (XX') corresponding to the axis of rotation of the wheel 1, up to a radially outer peripheral edge 6, as seen in particular in FIGS. 2 and 3.

In order to improve the strength of the wheel 1 and to simplify the manufacture, said carrier core 3 will be preferably produced in one-piece, and more preferably over-molded in one-piece on the socket 2, or even directly on the shaft (said shaft can be accordingly integrated in the manner of a core, within the first mold 30), the inner wall 41 of the bore conforming to (and more particularly covering) the radially outer gripping surface of said socket (respectively of said shaft).

The main axis (XX') will advantageously correspond to the axis of rotation of the wheel 1, shared by the different constitutive elements of said wheel 1, and will be in practice materialized by the aforementioned shaft.

For the sake of description, "axial" means a direction or a dimension considered according to said main axis (XX') or parallel thereto, and "radial" means a direction or a dimension considered transversely, and more particularly perpendicularly, to said main axis (XX').

According to the invention, the method further comprises, after step (a) of producing the carrier core 3, a coating step (b) during which is produced by overmolding operation on the carrier core 3, in a second polymer material, a coating layer 7 in order to form a rim 8 about the peripheral edge 6 in the radial over-thickness of the radially outer surface 6E of said peripheral edge 6, as seen in particular in FIG. 2.

Where appropriate, the meshing teeth (not represented) can be formed, and more particularly cut, in the radial thickness of said rim 8.

According to a preferred arrangement, the carrier core 3 comprises a hub 4, which extends axially between a (the) radially inner wall 41 forming the bore and a radially outer surface 4E, a flange 5 which extends substantially radially from said hub 4 (and more particularly from the radially outer surface 4E of said hub 4 on which said flange 5 starts) up to a flanged edge, flanged edge which is distinct and radially spaced from the radially outer surface 4E of the hub, and which forms the peripheral edge 6 (and can therefore be assimilated to said peripheral edge 6 in what follows, for the sake of description and numbering).

As illustrated in FIGS. 2 and 3, the flanged edge 6 is advantageously integral with the flange 5 extended by the latter, and is turned down, relative to said flange 5, toward a direction substantially parallel to the main axis (XX') so as to form a substantially L-shaped angle, with the flange 5.

The carrier core can thus present a convex, hollow and substantially bell-shaped form which is robust, rigid and lightweight.

Such as seen in FIG. 2, the flange 5 is delimited axially by a surface called "upper" surface 5S oriented on the side axially opposite to the flanged edge 6, and by a surface called "lower" surface 5I axially orientated on the side of the flanged edge 6, opposite to the coating layer 7.

The lower surface 5I is preferably intended to remain bare, devoid of coating layer.

Preferably, the coating layer 7 comprises in one-piece, on the one hand, a front layer 7F which covers the upper surface 5S of the flange 5 in the axial over-thickness of said flange and, on the other hand, a lateral layer 7L which extends axially said front layer 7F by covering the radially outer surface 6E of the flanged edge 6, in the radial over-thickness of said flanged edge, in such a manner that said lateral layer 7L forms the aforementioned rim 8.

The (solid) flange 5 preferably surrounds the hub 4 over the entire circumference of said hub, at 360 degrees about the main axis (XX'), to serve as the spokes of the wheel, so as to be able to ensure a stable connection between said hub 4 and the rim 8 situated at the periphery of the toothed wheel 1.

As such, it will be noted that the overall diameter D5 of the flange 5, and more globally the overall diameter of the carrier core 3, will be preferably equal to or greater than 50%, 60% or even equal to 75% of the overall diameter D1 of the finished wheel 1, and preferably less than or equal to 90% or even equal to 85% of said overall diameter D1 of the finished wheel. By way of indication, in the provided FIG. 2, this ratio D5/D1 is about 84%.

Furthermore, although the invention is not limited to a wheel 1 of particular dimensions, it will be noted that, in particular in the case of a wheel 1 intended for a power steering reducer, the overall diameter D1 of the wheel 1 can be substantially comprised between 3 cm and 20 cm, more particularly between 5 cm and 15 cm, and preferably equal to 10 cm.

The hub 4 will preferably extend axially beyond the thickness of the flange 5, in order to ensure sufficient axial support of the wheel 1 on its shaft.

Preferably, for the safety of compactness, said hub 4 will extend, at least in part, projecting axially from the lower surface 5I, inside the volume which is enveloped by the flange 5 and the flanged edge 6, as seen in particular in FIGS. 2 and 3.

In a particularly preferable manner, the hub 4 will extend (exceed) axially on either side of the flange 5, projecting axially from the upper surface 5S as well as, conversely, projecting axially from the lower surface 5I.

Figure 6:
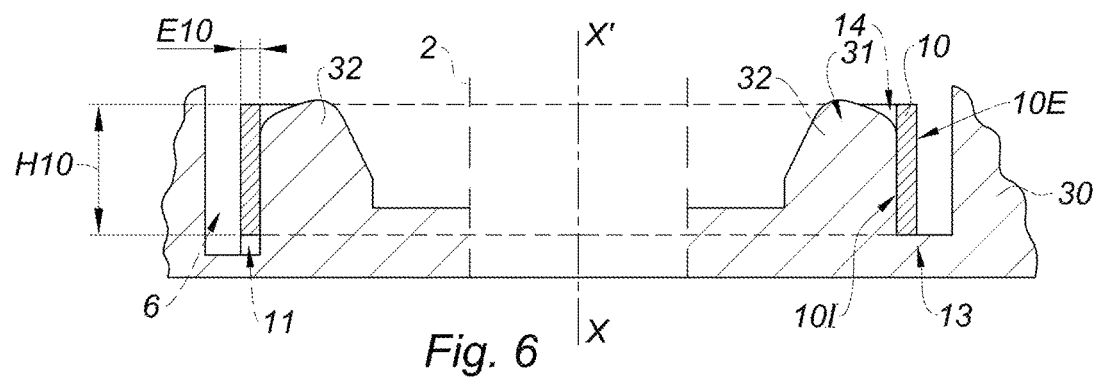
FIG. 6 illustrates, according to a schematic view, the installation of the reinforcing ring within the first mold before the injection of the first material intended to form the carrier core.

According to the invention, during step (a) of producing the carrier core 3, is placed in the first mold 30, in the position substantially centered on the main axis (XX'), and before the injection of the first material, as schematized in FIG. 6, a preformed reinforcing ring 10, made of a third material called "reinforcing material" which is distinct from the first polymer material and from the second polymer material and which has a Young's modulus greater than that of the first material and that of the second material, then is embedded, at least partially, said reinforcing ring 10, while injecting the first material, in the mass of said first material which forms the peripheral edge 6.

In this manner, by adding a reinforcing ring 10 made in a material more rigid than the first and second polymer materials used respectively to form the carrier core 3 and the rim 8, said peripheral edge 6, and more globally the wheel 1 is advantageously reinforced, in particular against the forces of the forces of centripetal radial crushing (which therefore allows to considerably reduce the deformations by depression of the rim 8, and thus to avoid the oval-making formation of the wheel 1 or the local formation of flat portions).

The presence of a reinforcing ring 10 will also give the wheel 1, where appropriate, better dimensional stability, in particular vis-à-vis the expansion or contraction thermal phenomena.

The reinforcing material, constituting the reinforcing ring 10, can be chosen so as to have at least according to the "longitudinal" direction of said reinforcing ring, that is to say according to the orthoradial direction, tangential to the (preferably circular) curve according to which said reinforcing ring 10 wraps about the main axis (XX'), a tensile Young's modulus greater than that of the first material and greater than that of the second material.

Advantageously, after being previously shaped, the reinforcing ring 10 (in the solid state, so as to be rigid or semi-rigid) can be engaged over any appropriate core or cavity 31 belonging to the first mold 30, so as to be automatically centered on the main axis (XX') then maintained in the position in said first mold 30 while filling said first mold 30 (by the first material intended to form the carrier core 3), that is to say during the first overmolding operation (carried out on the socket 2 or the shaft).

Preferably, the reinforcing ring 10 has a cross section whose axial height H10 is strictly greater than the radial thickness E10.

Such a configuration will in particular allow to produce a radially compact reinforcing ring 10, but nevertheless ensuring an axially extended shoring up, with regard to the axial support of the wheel 1, and more particularly with regard to the axial support of the rim 8.

The cross section of the reinforcing ring 10 can of course have any appropriate shape.

However, preferably, as illustrated in FIGS. 2 to 6, the cross section of the reinforcing ring 10 will be substantially rectangular.

Such a shape allows in particular to simplify the manufacture of said reinforcing ring 10 and to optimize the compactness (in particular in radial thickness) with regard to the desired robustness.

By way of indication, the radial thickness E10, furthermore preferably constant over the entire circumference of said reinforcing ring, can be comprised between 0.1 mm and 3 mm, depending in particular on the used reinforcing material.

The axial height H10 of said reinforcing ring 10, furthermore preferably constant over the entire circumference of said reinforcing ring, can for its part be comprised between 20% and 75% of the overall axial height H1 of the wheel 1 (Here equal to the axial height H3 of the carrier core).

Furthermore, it will be noted that the reinforcing ring 10 can be (pre)formed by any appropriate method, and in particular by bending (plastic deformation) of an initially planar strip, by cutting a segment of profiled tube, or by molding operation (prior to the step (a) of producing the carrier core 3).

Preferably, as illustrated in FIGS. 2 and 3, the reinforcing ring 10 is pressed against the radially inner surface 6I of the flanged edge 6, which faces the radially outer surface 4E of the hub 4.

In other words, the reinforcing ring 10 covers preferably the inner wall of the flanged edge 6, vis-à-vis (and at a distance from) the radially outer surface 4E of the hub 4, under the dome formed by flange 5 and said flanged edge 6, and opposite to the rim 8, and more globally opposite to the coating layer 7, relative to said flanged edge 6 (respectively relative to the flange 5).

Advantageously, such an arrangement allows using the recessed structure of the carrier core 3 for easily housing the reinforcing ring 10 therein.

Further, such an arrangement facilitates overmolding the reinforcing ring 10 by the first material, insofar as it is sufficient to engage, before said overmolding operation, said reinforcing ring 10 in a tangent manner over the outer circumference of the cavity 31 (male) of the first mold 30 having a shape matching the shape of the lower surface 5I of the flange and of the radially inner surface 6I of the flanged edge, as illustrated in FIG. 6.

It will be noted that the lower edge of the reinforcing ring 10 can be advantageously bordered, and thereby axially retained, by an inward stop ledge 11 (also formed in the first material, and attached to the rest of the flanged edge 6).

Said stop ledge 11 can have notches 12 distributed around the main axis (XX') and which correspond to the passage of pads 13 of the first mold 30, said pads 13 forming themselves abutments against the axial depression of the reinforcing ring 10, in order to allow the (reproducible) insertion and the maintaining of said reinforcing ring 10 in a suitable axial position (and more globally according to an adapted base) when molding the carrier core 3.

Preferably, during step (a) of producing the carrier core 3, is formed, by injection of the first material, a plurality of reinforcing ribs 17 disposed in a plurality of azimuths about the main axis (XX') in order to locally reinforce the axial thickness of the flange 5, said reinforcing ribs 17 each connecting the radially outer surface 4E of the hub 4 to the radially inner surface 6I of the flanged edge 6 as well as to the lower surface 5I of the flange 5 (which is axially oriented on the side of said flanged edge 6), as seen in FIGS. 1 to 3.

These reinforcing ribs 17 contribute to the strength and rigidity of the carrier core 3, and more globally of the wheel 1, while preserving a lightweight structure, thanks to the presence of empty cells 18 between said reinforcing ribs 17.

Preferably, as illustrated in FIGS. 2 and 3, the arrangement of the reinforcing ring 10 against the inner surface 6I of the flanged edge 6 allows, once the cavity 31 of the mold 30 is removed, to leave the radially inner surface 10I of the reinforcing ring 10 (which forms in this case one of the two large faces of said ring), at least in part, apparent and open on the inside of each cell 18.

In a particularly preferred manner, to ensure in particular its robustness, the reinforcing ring 10 is formed in one-piece.

According to a possibility of implementation, the reinforcing ring 10 is made of a metal reinforcing material, such as the steel.

Such a choice allows obtaining a particularly rigid and resistant reinforcing ring 10, even with a small radial thickness E10 which preserves the compactness of the wheel 1.

As such, the radial thickness E10 of a metal, and more particularly steel, reinforcing ring 10, can be comprised between 0.5 mm and 3 mm.

However, if we use a metal reinforcing material, which has little chemical affinity with the first polymer material constituting the carrier core 3, it will be appropriate to texture the surface of the reinforcing ring 10 and/or to sufficiently embed the reinforcing ring 10 in order to securely anchor within the carrier core 3, by blocking said reinforcing ring in all directions.

For this purpose, we can use for example the stop ledge 11 described above, which offers a lower axial abutment completing the upper axial abutment formed by the mass of the flange 5, the inner surface 6I of the flanged edge 6 offering for its part an outer radial abutment, as well as a retaining lip 14 (FIG. 3) which comes into contact with the upper edge of the reinforcing ring 10 in order to offer an inner radial abutment, or any other equivalent immobilization configuration.

Figures 4, 5:
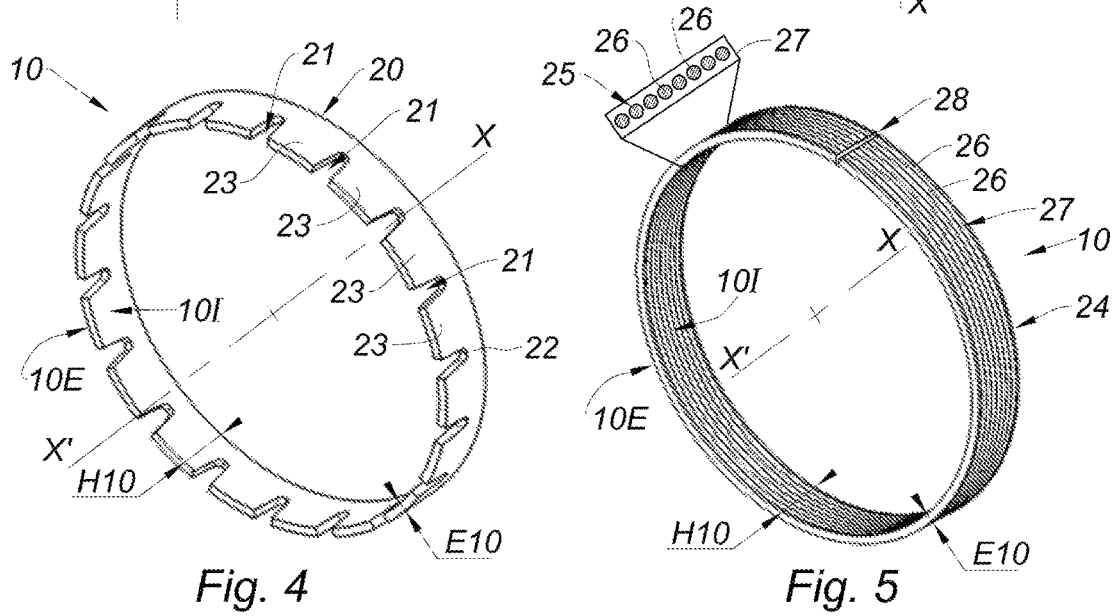
FIG. 4 illustrates, according to a perspective view, a first variant of reinforcing ring according to the invention, of the serrated crown type.
FIG. 5 illustrates, according to a perspective view, a second variant of reinforcing ring according to the invention, of the reinforced tape type, with a detailed view of the cross section of said reinforced tape.

According to one possibility of implementation, particularly well adapted (but not exclusively) to the use of a metal reinforcing material, and which can constitute a full-fledged invention, the reinforcing ring 10, as illustrated in FIG. 4, is in the form of a serrated crown 20 provided with a plurality of passage slots 21 allowing the reinforcing ribs 17 (secant to said reinforcing ring 10) to pass through the radial thickness E10 of the reinforcing ring 10 without being interrupted by said reinforcing ring 10.

For this purpose, the passage slots 21 have a shape substantially matching the shape of the reinforcing ribs 17, and will be more particularly substantially axially oriented and open on the axially upper on the axially upper edge of the reinforcing ring 10.

The serrated crown 20 thus presents a (preferably uninterrupted) annular root 22, which preferably bears against the stop ledge 11, and on which point axially tabs 23 separated from each other by the passage slots 21 (and whose axial height, greater than that of the root 22, corresponds to that H10 of the reinforcing ring 10).

Advantageously, the use of a serrated crown 20 allows, on the one hand, to benefit from the rigidifying effect procured by the reinforcing ring 10, whose solid tabs 23 form as many elementary arches each lining and shoring one of the hollow angular sectors corresponding to the cells 18, to the back of the flanged edge 6 and of the rim 8, while preserving, on the other hand, the continuity and the integrity of the polymer structure of the carrier core 3, thanks to passage slots 21 which allow the reinforcing ring 10 to cross the reinforcing ribs 17 by spanning said reinforcing ribs, without notching or strangling or severing said reinforcing ribs 17, and therefore without weakening them.

According to one possibility of implementation, the reinforcing ring 10 is formed, as illustrated in FIG. 5, by a reinforced tape 24 made in a composite reinforcing material which comprises a frame 25 in continuous reinforcing fibers 26, which extend along the perimeter of the reinforcing ring 10, according to a direction orthoradial to the main axis (XX'), said frame 25 being embedded in a matrix 27 made of thermoplastic polymer material.

The reinforced tape 24 can be performed for example by impregnation (of the fibers 26 by the matrix 27 in the liquid state) and then by calendering.

Said reinforced tape 24 can then be cut to the desired length then hot-wrapped around itself, before being cooled and hardened in its final ring 10 shape.

The frame 25 can advantageously be formed by a bundle or a web of reinforcing fibers 26 oriented parallel to one another, each drawing, in a plane normal to the main axis (XX'), a circle that corresponds to the outline of the reinforcing ring 10 about said main axis (XX').

Said fibers 26 will be advantageously continuous, that is to say, each will extend in one-piece, without interruption, over the entire length of the reinforcing ring 10, that is to say substantially over the entire perimeter of said reinforcing ring 10, which will give the reinforced tape an excellent tensile resistance (according to a stress direction orthoradial vis-à-vis the main axis).

The reinforcing fibers 26 can in particular be glass fibers, carbon fibers, aramid fibers, or a combination of two or three of these types of fibers.

The matrix 27 can for its part be for example made of polyamide PA66.

According to a preferred variant of implementation, the matrix 27 can be made of a material which has a good chemical affinity with the first material forming the carrier core 3, and for example a material of a composition identical or partially identical to the composition of said first material.

Particularly, the matrix 27 can have a glass transition temperature close to that of the first material used to form the carrier core 3.

In this way, after introducing the reinforcing ring 10 in solid form into the mold 30, we can, while injecting the first material, melt partially (superficially) the matrix 27, so as to increase its chemical as well as its mechanical interaction with the first material and, consequently, improve the quality of the fixing of the reinforcing ring 10 on the carrier core 3.

Thus, during step (a) of producing the carrier core 3, an at least partial re-fusion of the matrix 27 of the reinforcing ring 10 is preferably carried out, so as to connect said matrix 27, on the one hand, with the flanged edge 6 and, on the other hand, with the reinforcing ribs 17, so that the reinforcing ring 10 forms an adhesion interface which radially interrupts the reinforcing ribs 17 (unlike the serrated crown 20 described above) while ensuring a connection between, on the one hand, the radially inner wall 61 of the flanged edge, to which adheres the radially outer surface 10E of said reinforcing ring and, on the other hand, said reinforcing ribs 17, which adhere to, and start on, the radially inner surface 10I of the same reinforcing ring 10.

According to such an arrangement, the reinforcing ring forms a separation interface between the reinforcing ribs 17 and the flanged edge 6, but without weakening the polymer structure of the carrier core 3, because said ring is perfectly "chemically" integrated to said structure, by offering an excellent cohesion of the "bonding" type between the reinforcing ribs 17 and the flanged edge 6, the matrix 27 somehow ensuring the continuity of the first material between said flanged edge 6 and said reinforcing ribs 17.

Furthermore, the thickness E10 of the composite reinforced tape 24 used to form the reinforcing ring 10 can be substantially comprised between 0.15 mm and 3 mm.

According to one possibility of implementation, which can be applied besides regardless of the composition of the reinforcing ring 10, the reinforcing ring 10 is split along its entire axial height H10 by an opening gap 28, as illustrated in FIG. 5, so as to facilitate the elastic clipping of said reinforcing rib 10 within the first mold 30.

Advantageously, the gap 28, which can be substantially parallel to the main axis (XX'), as it is the case in FIG. 5, or obliquely inclined so as to cut in a beveled manner the reinforcing ring 10, allows said reinforcing ring 10 to elastically adjust its diameter in order to accommodate the shape of the first mold 30, and more particularly of the male cavity 31.

Thus, the installation of said reinforcing ring 10 in the mold 30 will be facilitated, and its spontaneous maintaining in position during injection of the first material is improved.

It will be noted that such an arrangement of the split reinforcing ring 10 is particularly well adapted for manufacturing said reinforcing ring from a strip, and in particular of an reinforced tape 24 as described above, that will be wrapped about itself to give it the required curvature and bring its two ends closer each other, which will then border the gap 28.

Of course, as a variant, it is perfectly possible to use a continuous and non-split reinforcing ring 10, which forms a one piece ring totally closed on itself, as illustrated in FIG. 4.

Whatever its shape and arrangement, the reinforcing ring 10 will be preferably engaged over the cavity 31 of the mold 30, as illustrated in FIG. 6, so as to encircle from the outside, in the manner of a tangential envelope, the bosses 32 which correspond to the (future) cells 18, and which are separated from one another, about the main axis (XX') by intervals corresponding to the (future) reinforcing ribs 17.

Furthermore, it will be noted that we can employ as a first material constituting the carrier core 3, and as a second material constituting the coating layer 7, any appropriate thermoplastic polymer.

Preferably, the first material constituting the core 3 will be more rigid than the second material (that is to say will present in practice a greater Young's modulus).

For this purpose, the first material can be formed by a composite reinforced with reinforcing fibers (or by more fibers, or more resistant fibers, if the second material is itself a composite).

The use of a second less rigid (more flexible) material to form the coating layer 7 will present several advantages.

Firstly, such a second material will be easy to machine, which will make the cutting of the meshing teeth fast and inexpensive.

Then, once the wheel 1 formed and implemented within a force transmission mechanism, and more particularly a worm screw reducer, the relative flexibility of the meshing teeth will allow them to conform to the shape of the threads of the worm screw, the relative flexibility of the meshing teeth will allow them to conform to the shape of the threads of the worm screw, which will increase the number of engaged teeth as well as the contact surfaces under high load. This relative flexibility will also allow to distribute and diffuse the load over a more extended portion of the carrier core 3 and thus to avoid the occurrence of high local stresses, which likely to be the cause of breaks.

The operation and longevity of the wheel 1 will in this way be improved.

The use of a first more rigid material, and more particularly a first fiber material, to form the carrier core 3, will advantageously contribute to limit the deformation under load of said core 3, and therefore, more globally, of the structure of the wheel 1.

The use of reinforcing fibers will further make said carrier core 3, and more globally the wheel 1, less sensitive to the thermal expansion phenomena, and will give said carrier core 3, which forms the most mechanically stressed portion of the wheel 1, better resistance to the mechanical fatigue as well as to the thermal and the chemical aging (vis-a-vis the lubricants used in the mechanism), which will therefore procure to the wheel 1 a better longevity.

Furthermore, although the first material and the second material preferably have compositions, and therefore separate mechanical properties, they will preferably have some chemical affinity (compatibility) towards each other and, where appropriate, glass transition temperatures close enough, in order to be able to adhesively bind to each other, and more particularly in order to be fixed to each other by superficial re-fusion of the first material (of the core 3) while injecting the second material (of the coating layer 7).

By way of indication, one can use a first composite material comprising a polymer matrix of the same composition as the second material but containing, to the difference of said second material, reinforcing fibers or, if the second material is itself a composite containing reinforcing fibers, a first material containing a larger concentration of reinforcing fibers, or reinforcing fibers of another nature to that of the first material.

By way of example, a fiber polyamide PA66 can be chosen at 50% of glass fibers as the first material, and a polyamide PA66 can be chosen as the second material.

Furthermore, it will be noted that the coating step (b) can be carried out in a second mold (not represented) which reuses at least in part the first mold 30, and in particular the lower male cavity 31 described above (which allows to mold the concave lower surface 5I of the opposite core 3 to the upper surface 5S), so that the method requires a relatively minimal tooling.

Such a method further allows to save energy because the second overmolding operation, intended to form the coating layer 7, can take place <<on the spot>>, as soon as the carrier core 3 is hardened (on the socket 2, or the shaft, and on the reinforcing ring 10), while said carrier core 3, and at least a portion of the first mold 30 (the reused portion, here the cavity 31) is still hot from the first overmolding operation.

Preferably, the method includes, after coating step (b), a step (c) of cutting teeth, during which meshing teeth are cut in the rim 8, preferably after having fixed the wheel 1 on its shaft.

Advantageously, by cutting the meshing teeth a posteriori, after having finished to mold the wheel 1, that is to say, especially after having performed all the steps of the first overmolding operation (of core 3 on the socket 2, or preferably on the shaft) and of the second overmolding operation (of the coating layer 7 on said core 3), and while the effective axis of rotation of the wheel 1 is already materialized by the socket 2 or even by the shaft on which said wheel 1 is fixed, so that said socket 2, respectively said shaft, forms a reference for the cutting machine, any defect of circularity and concentricity between the pitch diameter of the teeth obtained by cutting and said effective axis of rotation can be avoided.

The invention also concerns as such a toothed wheel 1 obtained by a method according to either or both of the described characteristics, and thus having either of the corresponding structural characteristics.

The invention further concerns as such the use of a reinforcing ring 10, according to either of the aforementioned characteristics, to reinforce a wheel 1, in particular a toothed wheel, made of a polymer material, and more particularly the use of such a reinforcing ring 10 to reinforce the carrier core 3 of such a wheel, by embedding said reinforcing ring 10 in the polymer mass of the wheel 1.

The invention concerns more particularly the use of an reinforced tape 24 (embedded in the polymer mass of the wheel) as a (rigid) reinforcing ring 10 of a wheel 1, in particular of a toothed wheel, and more particularly as reinforcing ring of the core 3 and/or the rim 8 of such a wheel.

Finally, the invention also relates to a mechanism, and in particular a power steering reducer, containing at least one wheel 1 obtained according to the method in accordance with the invention.

Of course, the invention is in no way limited to the sole variants described in the above, those skilled in the art being in particular able to isolate or to freely combine together either of the aforementioned characteristics, or to substitute equivalents thereto.

The invention claimed is:

1. A method for manufacturing a wheel, said method comprising:

a step (a) of producing a carrier core by injection of a first polymer material in a first mold, wherein the carrier core extends from a radially inner wall forming a bore having a main axis, corresponding to an axis of rotation of the wheel, up to a radially outer peripheral edge, and a coating step (b) during which a coating layer of a second polymer material is formed over the carrier core by an overmolding operation in order to form a rim about the peripheral edge, in the radial over-thickness of the radially outer surface of said peripheral edge, wherein, during the step (a) of producing the carrier core, and before the injection of the first polymer material, a preformed reinforcing ring made of a third material is placed in the first mold, in a position substantially centered on the main axis, then is embedded, at least partially, in the mass of said first material which forms the peripheral edge while injecting the first material, wherein the third material is distinct from the first polymer material and from the second polymer material and has a Young's modulus greater than a Young's modulus of the first material and greater than a Young's modulus of the second material, and wherein the reinforcing ring is formed by a reinforced tape made in a composite reinforcing material which comprises a frame made of continuous reinforcing fibers that extend along the perimeter of the reinforcing ring, according to a direction orthoradial to the main axis, said frame being embedded in a matrix made of thermoplastic polymer material.

2. The method according to claim 1, wherein the carrier core comprises a hub, which extends axially between a radially inner wall forming the bore and a radially outer surface, a flange which extends substantially radially from said hub up to a flanged edge, which is distinct and radially spaced from the radially outer surface of the hub, and which forms the peripheral edge, and wherein the reinforcing ring is pressed against the radially inner surface of the flanged edge, which faces the radially outer surface of the hub.

3. The method according to claim 2, wherein, during step (a) of producing the carrier core, a plurality of reinforcing ribs is formed by injection of the first material, the plurality of reinforcing ribs disposed according to a plurality of azimuths about the main axis in order to locally reinforce the axial thickness of the flange, said reinforcing ribs each connecting the radially outer surface of the hub to the radially inner surface of the flanged edge as well as to the lower surface of the flange, which is axially oriented on the side of said flanged edge.

4. The method according to claim 3, wherein the reinforcing ring is in a form of a serrated crown provided with a plurality of passage slots allowing the reinforcing ribs to pass through the radial thickness of the reinforcing ring without said reinforcing ribs being interrupted by said reinforcing ring.

5. The method according to claim 3, wherein during step (a) of producing the carrier core, an at least partial re-fusion of the matrix of the reinforcing ring is carried out, so as to connect said matrix with the flanged edge and with the reinforcing ribs, so that the reinforcing ring forms an adhesion interface which radially interrupts the reinforcing ribs while ensuring a connection between the radially inner wall of the flanged edge, to which adheres the radially outer surface of said reinforcing ring and said reinforcing ribs, which adhere to, and start on, the radially inner surface of the same reinforcing ring.

6. The method according to claim 1, wherein the reinforcing ring has a cross section, whose axial height is strictly greater than the radial thickness.

7. The method according to claim 1, wherein the reinforcing ring is split along its entire axial height by an opening gap so as to facilitate an elastic clipping of said reinforcing ring within the first mold.

8. The method according to claim 1, further comprising, after the coating step (b), a step (c) of cutting teeth, during which meshing teeth are cut in the rim.

* * * * *